May 2, 1950 W. G. H. FINCH 2,506,269

HIGH-SPEED FACSIMILE SYNCHRONIZING SYSTEM

Filed Sept. 28, 1945

INVENTOR.
WILLIAM G. H. FINCH
BY
Obrolenk and Faber
ATTORNEYS

Patented May 2, 1950

2,506,269

UNITED STATES PATENT OFFICE 2,506,269

HIGH-SPEED FACSIMILE SYNCHRONIZING SYSTEM

William G. H. Finch, Newtown, Conn.

Application September 28, 1945, Serial No. 619,170

2 Claims. (Cl. 178—69.5)

Figure 1:
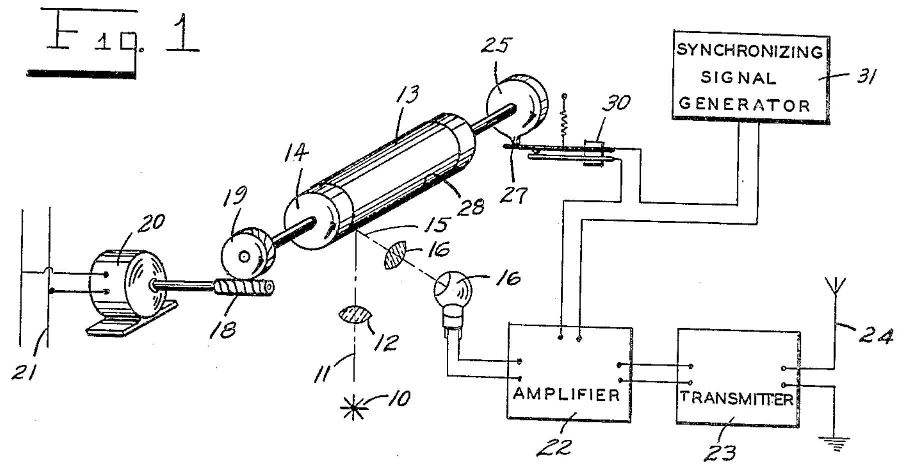

My present invention relates to the transmission and reception of facsimile by wire or radio, and more particularly to novel synchronizing mechanism which will operate efficiently at high speed picture transmission.

Heretofore in the transmission and reception of facsimiles, it has been necessary where absolute synchronism was desired between the transmitting and receiving apparatus to transmit the facsimiles at a relatively slow speed. This relatively slow speed of about one hundred lines per minute has nevertheless been regarded as a rather high speed. For instance, where a drum was ten inches wide and one hundred lines per inch was transmitted, then at this speed a picture ten inches long and having a width only slightly less than the circumference of the drum, was transmitted in ten minutes or less. Modern developments have made it possible, however, to transmit facsimiles by photo-recording or chemical recording processes at a much higher speed. Thus, for instance, it has been found that without any attempt to maintain synchronism, speeds as high as four hundred lines per minute became feasible, and thus the ten inch picture above described could be transmitted in two and one-half minutes.

Heretofore synchronizing systems have consisted essentially of stop-start mechanisms of the type specifically described in my Patent No. 2,108,983. The receiving drum was rotated at a slightly greater speed than the transmitter, say, in a ratio of 101:100, so that the receiving drum would reach the synchronizing area first. The receiving drum was then brought to a stop or its rate of speed adjusted practically to zero for an extremely short interval pending the receipt of a synchronizing signal which would permit the receiving drum to start once more. The arrangement of the mechanical elements as well as of the electrical elements used for synchronizing was such that at one hundred lines per minute, the receiving drum could readily be brought to a stop and started once more at a rate approaching twice per second.

Where higher speeds were attempted, the start-stop method could be adapted by various adjustments to work properly at a scanning rate of one hundred twenty lines per minute (exactly two stop-start operations in each second), and even slightly higher, but at speeds of four hundred lines per minute the stop-start mechanism created too much vibration, thus interfering with the quality of the image being recorded, and at times causing the synchronizing impulse to be skipped entirely due to the vibration introduced.

My novel synchronizing system contemplates a means whereby start-stop methods of synchronism may be avoided.

Essentially my invention contemplates that the synchronizing signal when received by the receiver at a time when the receiver is operating in absolute synchronism with the transmitter will have no effect at all on the receiver; if the receiver is operating too quickly, then at the receipt of the synchronizing signal apparatus at the receiver associated with the element thereof which receives the synchronizing signal will slow down the receiver to the degree necessary to correct for its excessive speed; if the receiver is operating too slowly, the same apparatus will speed up the receiver to the degree necessary to bring its speed into synchronism with the transmitter.

Since these corrections at the receiver are not start-stop corrections, then even though the receiver is rotating at extremely high speed, corrections of the receiver to bring it into synchronism may be made at every cycle.

My novel system is a definite advance over prior systems in that it does not stop or adjust the receiver in any way if the receiver is in synchronism with the transmitter.

Essentially my invention comprises a reversing motor or a pair of reversing motors connected to the receiver shaft or arranged so that the armatures are carried by the receiver shaft.

Switching means at the receiver switches in one motor just before the area at which the synchronizing signal should be received and the other motor at the area just following that at which the synchronizing signal should be received. If the synchronizing signal is received at the proper area, neither motor or set of coils of the single motor where a single motor is used, is energized. If the synchronizing signal is received too soon or too late, then the appropriate motor on the appropriate side of the area at which the synchronizing signal should be received is operated to correct the receiver and bring it into synchronism.

Since the main driving elements of the receiver and transmitter are operated preferably by synchronous motors at approximate synchronism, the corrections required should the receiver speed vary from that of the transmitter are relatively slight.

Where such synchronous motors are used for the main drive, it has been found that with no synchronizing apparatus the degree of asynchronism rarely increases to as much as 5% during the course of sending of an entire picture. Consequently the corrections which are required at each cycle are relatively very slight and can readily be made even though the receiver apparatus is operating at extremely high speed.

A primary object of my invention therefore is the provision of a novel synchronizing system adapted for use in connection with high speed transmission of facsimile images in which the synchronizing system may nevertheless maintain proper synchronism between the transmitter and receiver despite the high speed operation.

Another object of my invention is the arrangement of my novel synchronizing system so that the receiver apparatus is not stopped in any way at any time nor is it affected at all if it is operating in synchronism.

Another object of my invention is the utilization of appropriate motors or a reversing motor to cyclically correct the speed of the receiver apparatus should it at any time become asynchronous with the transmitter.

Figure 2:
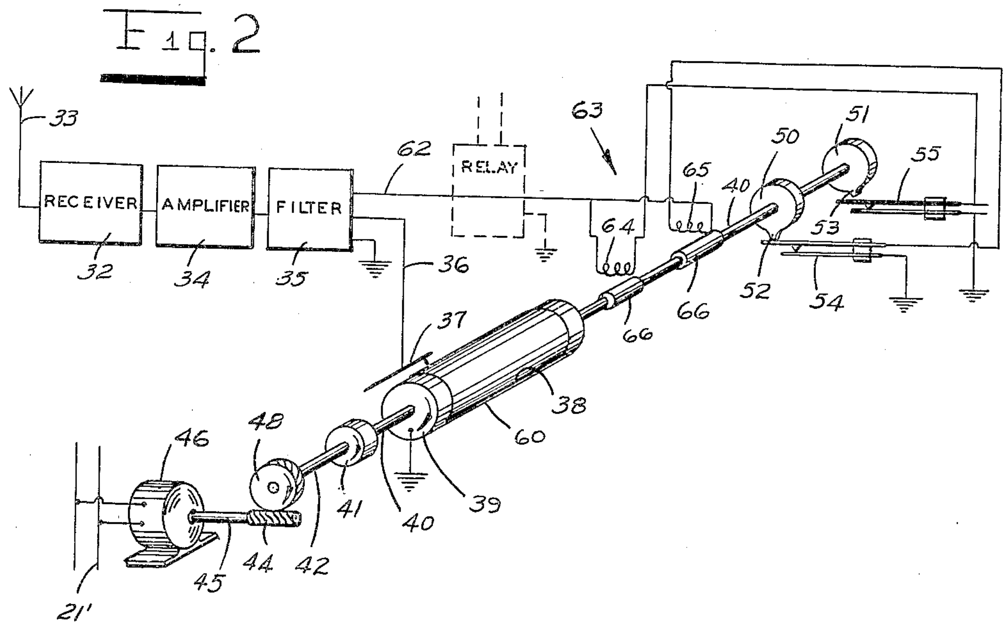

The foregoing and many other objects will be apparent from the following description thereof and the accompanying drawings, wherein:

Figure 1 is a schematic view showing a transmitter arranged in accordance with my novel synchronizing system; and Figure 2 is a schematic view of a transmitter arranged in accordance with my novel synchronizing system.

The schematic diagrams Figures 1 and 2, of a telepicture transmitter and receiver, respectively, are described to more clearly set forth the function and relation of the synchronizing mechanism of my present invention. It is to be understood that the telepicture system and circuits described are by way of example only and that the synchronizing mechanism to be hereinafter described in detail is applicable to other telepicture or facsimile systems.

Referring to Figure 1, a source of light 10 generates a beam 11 focused to a point by a lens system 12 upon the picture 13 to be transmitted, which is mounted on the cylindrical drum 14. If the picture is scanned one hundred lines per inch, the diameter of the light spot focused upon the picture 13 should be .01 inch. The refracted beam 15 from the picture is focused upon the photoelectric cell 16 by lens system 17. The intensity of the refracted beam 15 is proportional to the shading of the picture elements which are successively moved past the light beam 11.

The picture drum 14 is rotated by worm 18 and worm gear 19 which suitably reduce the speed of the motor 20. Motor 20 is preferably a synchronous motor connected to a commercial electrical supply line 21, for example a sixty-cycle, 110-volt system. The drum may be driven at a normal speed of 400 revolutions per minute which, with four hundred lines scanned by per inch, results in one inch of the picture traversed per minute.

The refracted picture light beam 15 impinging on photoelectric cell 16 produces corresponding electrical signals which are amplified by amplifier 22. A light "chopper" or an audio frequency carrier wave may be employed with the amplifier 22 to facilitate transmission of the varying unidirectional picture signals, as is well known in the art.

The telepicture signals may be directly transmitted to a remote station over wire lines or may be transmitted by radio transmission means.

Figure 1 illustrates a transmitter 23 connected to the output of amplifier 22 for converting the audio frequency telepicture signals into corresponding radio frequency signals which are radiated by antenna 24.

Synchronizing signals are cyclically transmitted for effecting synchronization of the transmitter scanning apparatus in a manner to be described in detail. The synchronizing signals are preferably transmitted once per scanning operation. When a drum is used as in the preferred embodiment, the "underlap" period of the rotation cycle is employed to transmit the synchronizing signal. The underlap period corresponds to the portion of the picture drum where the opposite ends of the picture 13 are gripped or otherwise fastened into position on the drum. In a continuous sheet system, the synchronizing signal is transmitted during the return oscillation movement, marking the beginning and end of each scanning line excursion. The transmission of a synchronizing signal for a continuous sheet system is described in my Reissue Patent No. 19,575.

A cam 25 is mounted upon the shaft 26 of the telepicture drum 14. A projection 27 of the cam 25 is positioned angularly corresponding to the underlap portion of the drum 14. The edge 28 of the picture sheet 13 determines one side of the underlap zone and is gripped by clamping means internal to the drum 14 in a manner preferably as described in my prior Patent No. 2,051,511.

The synchronizing cam switch 30 is cyclically closed by the cam projection 27 to impress suitable synchronizing impulses upon the amplifier 22 from the synchronizing signal generator 31. Synchronizing switch 30 is connected in series with the synchronizing signal generator 31 output to a suitable portion of the telepicture amplifier 22 schemactically indicated in Figure 1. The synchronizing impulse effective during the underlap period is preferably of intensity somewhat greater than the maximum or "white" telepicture signal intensity in order to readily distinguish the synchronizing signals from the telepicture signals at the receiver.

The synchronizing signal generator 31 may be a direct current source which produces a unidirectional impulse at each closure of cam switch 30, or may be an audio carrier frequency signal which is unmodulated during the synchronizing period and is suitably modulated by the picture signals during the remaining period of the cycle. A preferred embodiment of such a method for signal generation forms the basis of my prior Patent No. 2,069,061.

Figure 2 is a schematic diagram of the receiver which cooperates with the transmitter of Figure 1. A radio receiver and rectifier 32 is connected to a receiver antenna 33 for receiving the signals from the radio transmitter 23. The output of the receiver is amplified by amplifier 34, and impressed through filter 35 over conductor 36 on the recording stylus 37 which engages the paper 38 on the recording drum 39. Drum 39 is rotatably mounted on shaft 40. Shaft 40 is driven through the clutch 41 by shaft 42 which in turn is driven by the worm gear 43 from the worm 44 on the shaft 45 of the motor 46, which is supplied from a supply line 21′ which preferably is at the same voltage and frequency as the supply line 21 for the transmitter.

Drum shaft 40 is extended to a pair of cams 50 and 51 having the projections 52 and 53, respectively, operating respectively the cam switches 54 and 55. The projections 52 and 53 are angularly displaced from each other by an angular distance equal to the angular width of the projection 27 of the transmitter of Figure 1, and this angular spacing between projections 52 and 53 corresponds to the underlap portion 60 of the receiver drum 39. As the receiver drum rotates in synchronism with the transmitter drum, cam 50 will close cam switch 54 just before the synchronizing signal is obtained by the closing of switch 30 at the transmitter. Cam switch 54 will then be opened just as the cam switch 30 at the transmitter is closed. Cam switch 55 at the receiver will be closed just as the cam switch 30 at the transmitter is opened. Consequently, if the receiver is rotating in exact synchronism with the transmitter, both switches 54 and 55 will be open during reception of the synchronizing signal. If the receiver drum is rotating too slowly, then the cam 50 will close the cam switch 54 while the switch 30 of the transmitter is closed, and the synchronizing signal will thus come in simultaneously with the closing of switch 54.

The synchronizing signal is a signal either of different amplitude or different frequency from the picture signal. The filter 35 is so arranged that the synchronizing signal will be passed therefrom over conductor 62 to the reversing motor assembly 63 and through the appropriately closed switch 54, 55. The reversing motor assembly 63 comprises essentially a set of field coils 64 for operation of the motor in one direction, and a set of field coils 65 for operation of the motor in the opposite direction. The armature 66, 66 of the motor assembly 63 is carried on shaft 40 of the drum 39. It will now be seen that when the cam switch 54 is closed at the time the transmitter switch 30 is closed and thus at the time of the receipt of the synchronizing signal, the synchronizing signal from conductor 62 will pass through field coil 65 to closed cam switch 54 and to ground. The coil 64 will be energized to provide a rotative torque to the armature 66, and hence to the shaft 40, in the same direction as the drum 39 is rotating, and thus will speed up the drum 39.

If the synchronizing signal is received at the time that cam switch 55 is closed, the condition will then exist that the drum 39 is rotating too rapidly. Current then passes from the filter 35 over conductor 62 to the field coil 64 and then to the closed cam switch 55 to ground. The field coil 64 is then energized for reverse rotation of the shaft 66 in a sense opposite to that in which it is rotating, and thereby will momentarily retard the shaft 40 and the drum 39.

Thus it will be seen that as long as the receiver is in absolute synchronism with the transmitter, the synchronizing signal has no operative effect on the receiver. The synchronizing mechanism is brought into operation by the synchronizing signal in the manner determined by the condition of the receiver. If the receiver is too fast, the synchronizing signal will be used to slow it down momentarily to establish proper phasing. If the receiver drum is too slow, the synchronizing signal will be used to speed it up momentarily, again to establish proper phasing.

By making projections 52 and 53 of the cams 50 and 51 relatively long, occupying, for instance, twice the angular extent of the transmitter projection 27, or even three times the angular extent of projection 27, the adjustment can be made very accurate. If the receiver drum is moving only slightly fast, then it will be slowed down for a relatively short portion of the time during which cam switch 55 is closed. If it is moving very much too fast, it will be slowed down over much more of the time during which the cam switch 55 is closed. The same condition holds true for corrections in the event of slow speed of the receiver drum 39.

It will thus be seen that my novel synchronizing system is particularly adapted to extremely high-speed facsimile operation with scanning lines occurring as frequently as 400 or 500 lines per minute. The synchronizing operation does not depend on start-stop or any other positive mechanical means which holds the receiver drum, at each revolution, but my novel system simply corrects any mis-phasing by a rapid shift of the drum 39 in one direction or the other in response to momentary energization of coil 64 or coil 65 of the motor 63.

It will be obvious that while I have here shown the use of a stylus operating in connection with a chemical recording on a drum, my invention is just as readily applicable to photoelectric recording as in my prior Patent No. 2,108,983; and spiral or lawnmower type recorders.

Since many variations and modifications of my invention will now be apparent to those skilled in the art, and since the foregoing is simply an illustrative embodiment of my novel synchronization principle, I prefer not to be bound by the specific disclosure herein contained, but only by the appended claims.

I claim:

1. In a facsimile system comprising a transmitter and receiver, said transmitter and receiver each including cyclically movable members and means operating the same in approximate synchronism with each other, means at the transmitter for transmitting a synchronizing impulse during a predetermined portion of each cycle, means at the receiver for receiving the synchronizing impulse, and additional means directly connected to said means for receiving the synchronizing impulse non-responsive to said synchronizing impulse when said receiver and transmitter are rotating in synchronism, and responsive to said synchronizing impulse when said receiver and transmitter are in asynchronism, said last-mentioned means being responsive to control the speed of movement of the receiver to the degree and in a sense necessary to compensate for the degree of asynchronism of the transmitter and receiver, the driving means for said cyclically operable member of the receiver being connected thereto through a clutch, said responsive means including a pair of switches and a pair of motors, said switches being operable by the cyclically operable member of the receiver, and both of said switches being open when the synchronizing signal is received at the period when the receiver and transmitter are in synchronism, one of said switches being closed just before the said last-mentioned period, and one of said switches being closed just after said last-mentioned period, each of said switches controlling a separate motor and each of the motors being adapted to operate the cyclically operable member in a direction opposite to the other.

2. In a facsimile system comprising a transmitter and receiver, said transmitter and receiver each including cyclically movable members and means operating the same in approximate synchronism with each other, means at the transmitter for transmitting a synchronizing impulse during a predetermined portion of each cycle, means at the receiver for receiving the synchronizing impulse, and additional means directly connected to said means for receiving the synchronizing impulse non-responsive to said synchronizing impulse when said receiver and transmitter are rotating in synchronism, and responsive to said synchronizing impulse when said receiver and transmitter are in asynchronism, said last-mentioned means being responsive to control the speed of movement of the receiver to the degree and in a sense necessary to compensate for the degree of asynchronism of the transmitter and receiver, the driving means for said cyclically operable member of the receiver being connected thereto through a clutch, said responsive means including a pair of switches and a pair of motors, said switches being operable by the cyclically operable member of the receiver, and both of said switches being open when the synchronizing signal is received at the period when the receiver and transmitter are in synchronism, one of said switches being closed just before the said last-mentioned period, and one of said switches being closed just after said last-mentioned period, each of said switches controlling a separate motor and each of the motors being adapted to operate the cyclically operable member in a direction opposite to the other, one of said switches being closed at the time of the receipt of the synchronizing signal in the event the receiver and transmitter are in asynchronism, the closing of the switch operating its associated motor to correct the movement of the cyclically operable member of the receiver in accordance with the sense and degree of asynchronism.

WILLIAM G. H. FINCH.

REFERENCES CITED

The following references are of record in the file of this patent:

UNITED STATES PATENTS

| Number | Name | Date |
|---|---|---|
| 1,739,949 | Cooley | Dec. 18, 1929 |
| 2,150,239 | Nichols | Mar. 14, 1939 |
| 2,230,822 | Artzt | Feb. 4, 1941 |
| 2,246,284 | Artzt | June 17, 1941 |
| 2,329,077 | Nichols | Sept. 7, 1943 |